United States Patent Office 3,544,362
Patented Dec. 1, 1970

3,544,362
PROCESS FOR IMPROVING THE DELUSTERING AND THE SLIPPING RESISTANCE OF TEXTILES
Hans Deiner, Neusaess-Lohwald, and Heinrich Singer, Horgau, Germany, assignors to Chemische Fabrik Pfersee G.m.b.H., Augsburg, Germany, a corporation of Germany
No Drawing. Filed Mar. 20, 1968, Ser. No. 714,428
Claims priority, application Germany, Mar. 29, 1967, C 41,896; June 3, 1967, C 42,529
Int. Cl. C09k *3/14;* D06m *15/00*
U.S. Cl. 117—139.5                                    4 Claims

ABSTRACT OF THE DISCLOSURE

Textiles are refined by being treated with organic solutions of reaction products of alcoholates of zirconium, titanium or aluminum of aliphatic, saturated, 1- or 2-valent alcohols with 2 to 6 carbon atoms, or with monoalkyl ethers of these 2-valent alcohols, whereby these monoalkyl ethers have totally 4 to 8 carbon atoms, and paraformaldehyde in a mol ratio of 1:1 to 1:10 in an organic inert solvent, whereupon the textiles are dried and possibly subjected to a heat treatment.

---

This invention relates to a process for refining textiles.

An object of the present invention is to improve prior art textile refining processes.

Other objects will become apparent in the course of the following specification.

In the accomplishment of the objectives of the present invention it was found that the use value of textiles is greatly increased if they are treated with organic solutions of reaction products of alcoholates of titanium, aluminum and/or zirconium of aliphatic, saturated, 1- or 2-valent alcohols with 2 to 6 carbon atoms or of monoalkyl ethers of these 2-valent alcohols, whereby these monoalkyl ethers have totally 4 to 8 carbon atoms, and paraformaldehyde, possibly in the presence of stabilizers, whereupon they are dried and possibly subjected to heat treatment. The reaction products of zirconium alcoholates are preferred. However, organic solutions of reaction products of titanium or aluminum alcoholates and paraformaldehyde are also well suitable.

Reaction products with increasing amounts of paraformaldehyde give particularly good effects. However, the stability of the products is then lowered. Therefore, the reaction products are appropriately stabilized by the addition of organic soluble metal salts of 2-, 3- or 4-valent metals of fatty acids with more than 5 and particularly 8–18 carbon atoms. Such metal soaps are preferred in which all valences of the metal ion are bound by fatty acid residues. However, metal soaps are also suitable in which the valences are not completely bound by fatty acids provided that at least 1 fatty acid residue per metal ion must be present. Examples of such metal soaps are aluminum-, barium-, magnesium-, lead-, tin-, zinc-octoate, barium-, calcium-, manganese-oleate, calcium, zinc-laurate, and aluminum-, magnesium-, tin-, titanium-, and zinc-stearate. Best suitable are metal soaps of magnesium, tin, titanium and zinc. These metal soaps can be already added while the reaction products are being produced, or they can be added subsequently to the solutions of reaction products, preferably dissolved in a little solvent.

The additions used in accordance with the process of the present invention greatly improve the stability of the bath, so that a completely spot-free finish is produced. Deposits which result from subsequent changes in the reaction products are eliminated by the addition of a stabilizer. This assures a proper operation. Furthermore, no undesired shiftings in color tones can take place, as can happen through iron complex formation when desmotropic solvents are used.

Alcoholates of zirconium, titanium and aluminum used for producing the reaction products, are derived from mono- or divalent saturated aliphatic alcohols with 2–6 carbon atoms or from monoalkyl ethers of these divalent alcohols, whereby these monoalkyl ethers have a total of 4–8 carbon atoms. Examples of such alcoholates which can be also partially polymerized are: alcoholates of zirconium and titanium with n-propanol, iso-propanol, n-butanol, iso-butanol, amylalcohol, propandiol-(1,2), butandiol-(1,4) or butandiol-(1,3), glycolmonobutyl ether, glycolmonohexyl ether, or alcoholates of aluminum with propandiol-(1,2), butandiol-(1,4) and others, glycolmonobutyl ether, 2-methylpentandiol-(2,4) and propylene glycol-n-butyl ether.

Particularly well suited are alcoholates of zirconium and titanium with low, alipatic, saturated alcohols and alcoholates of aluminum with divalent alcohols or monoalkyl ethers of these divalent alcohols, whereby the monoalkyl ethers have specifically 6–8C atoms. Mixtures of metal alcoholates are also usable.

The mol ratios for the reaction products can vary within a wide range. Usable products are obtained already with a mol ratio of alcoholate to paraformaldehyde of 1:1, but good results are also obtained with reaction products with a mol ratio of 1:10. A mol ratio of 1:3 to 1:8 is preferred. The amount of the stabilizer, the use of which is preferred, is 0.06–1 mol, more specifically 0.06–0.5 mol per mol of alcoholates. In general, when reaction products of titanium alcoholates are used smaller amounts of stabilizers are added, while larger amounts are added when reaction products of zirconium and aluminum alcoholates are used.

The production of textile refining agents of the present invention takes place simply by heating for 5 to 20 minutes the initial components, metal alcoholate, paraformaldehyde and eventually metal soap under a reflux condenser, or by heating them while distilling away the alcohol which is liberated. The reaction product which is thus produced is then advantageously combined or diluted with chlorated hydrocarbons, such as tetrachlorethylene, and is cooled. Equally good products are obtained when only the metal alcoholate and the paraformaldehyde are heated and promptly thereafter in case of an immediate stabilization the metal soap is added, the stirring being then continued until a clear or an opalescent solution is produced, which then is also advantageously combined or diluted with tetrachlorethylene or the like, and is then cooled. Undiluted reaction products are also stable and usable. However, for better handling it is advantageous to work with solutions of the produced reaction products.

The reaction products which may be stabilized are well soluble in benzine or chlorated hydrocarbons and are used depending upon the type of material and the purpose of the application in amounts ranging between 2 to 20 gr. per liter of the pure 100% reaction products. To produce a good slipping resistance from 4 to 10 gr. per liter of the reaction products are used, while for good delustering the amount is 10 to 20 gr. per liter. The delustering effect or the slipping resistance are produced after the removal of the solvent merely by drying at a temperature of 70° C. to 110° C. In case of wool textiles the fixing is also possible by a decating of short duration. Under certain conditions, it is advantageous to combine other textile auxiliary means and heat for a short time to higher temperature, for example to heat for 5 minutes to 140° C.

The treating process of the present invention is suitable for fabrics of natural as well as synthetic fibrous material, and also for mixed fabrics produced therefrom.

Apparatus suitable for the process may consist of continuity devices constructed for treating lengths of materials with organic solutions according to the foulard principle. However, machines used in chemical cleaning for the after-impregnation of clothing are also suitable. Finally, treatment can also take place by the spraying of baths.

The produced reaction products can be also advantageously combined with other known textile refining agents which are soluble in organic solvents. Thus in addition to slipping resistance, a good hydrophobic effect can be produced by a joint use with paraffin and artificial resin or organopolysiloxanes. Furthermore, a combination with finishing agents and softeners is also possible.

By way of example, solutions of the reaction products which can be used in accordance with the present invention, can be produced as follows:

(a) 150 gr. of a 100% zirconium tetra-n-propylate, 50 gr. paraformaldehyde and 20 gr. tin octoate are heated while stirring to 115° C., so that about 50 gr. n-propanol are distilled off. The reaction product thus obtained is then diluted with tetrachlorethylene to a 25% solution.

(b) 102 gr. of a 100% titanium tetra-n-propylate, 30 gr. paraformaldehyde and 10 gr. tin octoate are stirred jointly and are heated to 140° C.; 45 gr. propanol are distilled off and the product is completed to a 25% solution with tetrachlorethylene.

(c) 150 gr. of a 50% solution of zirconium tetra-n-propylate in propanol, 50 gr. paraformaldehyde and 20 gr. magnesium stearate are heated to 105° C. to 110° C. while stirring so that about 95 gr. n-propanol are distilled off. The reaction product thus obtained is set to a 25% solution with tetrachlorethylene.

The zirconium tetrapropylate solution which is used here can be trans-esterified with glycol monohexylether as described in example (d) into the corresponding alcoholate prior to the reaction with paraformaldehyde and magnesium stearate.

(d) 118 gr. of pure aluminum triisobutylate and 240 gr. of water-free 2-methyl-pentandiol-(2,4) are stirred jointly and are heated to 95° C. until a clear solution is produced. After cooling 30 gr. paraformaldehyde and 80 gr. tin-octoate are added; 90 gr. isobutanol are distilled off at 140° C. and the product is diluted with tetrachlorethylene to a 25% solution.

A clear 25% product solution of the same effectiveness is produced when the mixture after the addition of 60 gr. paraformaldehyde and 35 gr. zinc-octoate is stirred for 10 minutes under a reflux condenser, heated to 100° C. and then cooled.

The water-free 2-methyl-pentandiol-(2,4) can be replaced by water-free butandiol-(1,4), glycol-monobutylether or -hexylether or the like.

(e) 150 gr. of a 50% solution of zirconium tetra-n-propylate in propanol and 20 gr. paraformaldehyde are heated while stirring to 120° C.; then about 95 gr. n-propanol are distilled off and then the product is diluted with tetrachlorethylene to 25%.

The zirconium tetra-n-propylate solution used herein can be replaced by 80 gr. of 100% titanium-tetra-n-propylate.

(f) The product produced in accordance with example (e) can be stabilized by adding after the n-propanol has been distilled off, 20 gr. tin-octoate in 350 gr. tetrachlorethylene at 80° C. and by subseqeunt stirring for 5 minutes at that temperature.

(g) 200 gr. of a 50% solution of zirconium tetra-n-propylate in n-propanol, 60 gr. paraformaldehyde and 15 gr. tin-octoate are heated to boiling for 10 minutes while stirring under a reflux condenser, are diluted with 75 gr. tetrachlorethylene to a permanent clear 50% solution and are then cooled.

(h) 100 gr. of a 50% solution of zirconium tetra-n-propylate in n-propanol, 50 gr. of a 50% solution of titanium tetra-n-propylate in propanol, 30 gr. paraformaldehyde, 30 gr. aluminum tristearate and 60 gr. butylacetate as solution promoter for the employed metal soap are heated to boiling while stirring for 10 minutes under a reflux condenser and then immediately cooled, whereby an approximately 50% clear solution is produced.

(i) 95 gr. of a 100% titanium tetra-n-propylate and 60 gr. paraformaldehyde are heated for 10 minutes while stirring under a reflux condenser to 95° C., then 40 gr. titanium tetrastearate are added and the stirring is continued until a clear solution is produced. Then the product is diluted with tetrachlorethylene to 50% and is cooled.

(k) 150 gr. of a 50% solution of zirconium tetra-n-propylate in n-propanol and 15 gr. paraformaldehyde are heated for 10 minutes under a reflux condenser to 95°, then 20 gr. zinc laurate are added and the stirring is contnued for 5 minutes until a practically clear solution is produced. The product is diluted with 35 gr. tetrachlorethylene and is then cooled.

(l) 95 gr. of 100% titanium tetra-n-propylate, 70 gr. paraformaldehyde and 10 gr. magnesium octoate are heated to boiling for 10 minutes while stirring under a reflux condenser, the solution thus obtained is diluted with perchlorethylene to 50% and is then cooled.

The following application examples are also given by way of exemplification only.

EXAMPLE 1

40 gr. of the product solution produced in accordance with example (a) are filled to 1 liter with tetrachlorethylene. This bath is used for foularding a viscose lining (twill), which is then pressed to a 120% bath absorption and is dried at 100° C. This produces a fabric which is very well delustered and exceptionally slip-resistant.

An equally good result is produced when 20 gr. per liter of a product solution obtained according to example (g) are introduced.

EXAMPLE 2

80 gr. of a product solution produced in accordance with example (d) are filled to 1 liter with trichlorethylene and this bath is used for foularding and acetate lining taffeta; it is pressed to 100% bath reception and is dried at 80° C. The lining is exceptionally well delustered and slip-resistant.

EXAMPLE 3

40 gr. of a product solution produced in accordance with example (b) are filled to 1 liter with trichlorethylene and this solution is used for foularding a polyester fabric (georgette); it is pressed to 80% bath reception and is dried at 100° C. The fabric which is thus treated has a very good slipping resistance.

A very good nonslip finish is also produced when 20 gr. per liter of a product solution obtained according to Example 1 are used.

EXAMPLE 4

30 gr. of a product solution produced in accordance with example (c) are filled with benzine to 1 liter. This bath is used to impregnate a perlon toile, which is then pressed to about 80% bath reception and is dried at 100° C. The fabric thus produced has excellent slip-resistant properties.

EXAMPLE 5

30 gr. of a product solution produced in accordance with example (e) are diluted with tetrachlorethylene to 1 liter. With this solution an acetate lining is foularded, pressed to 100% and dried at 80° C. The fabric thus produced is provided with very good slipping resistance.

A more stable bath is produced when additionally 6 gr. per liter of magnesium laurate are added.

EXAMPLE 6

70 gr. of a product solution produced in accordance with example (f) are filled with trichlorethylene to 1 liter. This solution is used to foulard a polyester fabric (georgette) which is pressed to 80% bath reception and dried at 100° C. The fabric thus produced has good slipping resistance and at the same time is exceptionally well delustered.

EXAMPLE 7

45 gr. of modified melamine resin which is produced according to Example 1 of Austrian Pat. No. 223,579, 15 gr. paraffin (F.P. 52° to 54°) and 30 gr. of a product solution produced according to example (a) are mixed and filled with tetrachlorethylene to 1 liter. This bath is used to impregnate a viscose lining which after being pressed to 120% bath reception, is dried at 100° C. The fabric thus treated has very good slipping resistance and at the same time is well impregnated for water repellency.

EXAMPLE 8

45 gr. of melamine resin produced in accordance with Example 1 of Austrian Pat. No. 223,579 and 70 gr. of a product solution produced in accordance with example (d) herein are dissolved in trichlorethylene and are filled to 1 liter. This bath is used for foularding an acetate lining taffeta. The fabric is pressed to 100% bath reception and is dried at 80° C. The sample thus produced is particularly well delustered and slip-resistant with good fastness to water spots.

EXAMPLE 9

A bath is produced from 75 gr. of a 30% solution of an after-chlorated polyvinylchloride in a mixture of 60 parts tetrachlorethylene and 10 parts butyl acetate, as well as 15 gr. of a product solution produced in accordance with Example h and filled to 1 liter with tetrachlorethylene. The bath is used to impregnate a polyester fabric (georgette) which is then pressed to 80% bath reception and dried at 100° C. The fabric has good slipping resistance and at the same time has a good handle finish.

EXAMPLE 10

75 gr. polyterpene and 15 gr. of a product solution produced in accordance with example (i) are dissolved in tetrachlorethylene and diluted to 1 liter. A muslin-delaine is impregnated with this bath, is pressed to 150% bath reception and thereupon dried at 90° C. A nonslip fabric is produced with a soft handle.

EXAMPLE 11

45 gr. of a softener consisting of equal parts of stearic acid butyl ester and trioleic acid glyceride, and 15 gr. of a product solution produced in accordance with example (k) are dissolved in benzine and filled to 1 liter. This bath is used to foulard a perlon taffeta which is pressed to 80% bath reception and dried at 100° C. The fabric thus produced has a very good slipping resistance and a soft flexible handle.

EXAMPLE 12

A viscose lining is impregnated with a bath consisting of 45 gr. of a softener composed of equal parts of stearic acid butyl ester and trioleic acid glyceride and 30 gr. of a product solution produced in accordance with Example 1, filled with trichlorethylene to 1 liter. The fabric is pressed to 120% bath reception and dried at 80° C. The fabric which is thus treated is very well delustered, has excellent slipping resistance and has a soft flexible handle.

EXAMPLE 13

15 gr. of a product solution produced in accordance with example (g) and 25 gr. methylhydrogen polysiloxane ($\eta_{20°\,C.}=20\text{--}30$ cp.; $s_{20°\,C.}=0.99\text{--}1.01$) are filled with tetrachlorethylene to 1 liter of a stable bath. A cotton fabric (square meter weight 160 gr.) is foularded with this solution, squeezed to 100%, dried for 15 minutes at 100° C. and condensed for 5 minutes at 140° C. The fabric thus produced shows in accordance with the Bundesmann test after 10 minutes sprinkling a water reception capacity of only 14% and has a very good water-repellent effect.

Equally good results are obtained when methylhydrogen polysiloxane is replaced by a mixture of equal parts of methylhydrogen polysiloxane and dimethylpolysiloxane.

It is apparent that the examples described above have been given solely by way of illustration and not by way of limitation and that they are capable of different variations and modifications within the scope of the present invention. All such variations and modifications are to be included within the scope of the present invention.

What is claimed is:

1. In a process for improving the delustering and the slipping resistance of textiles by impregnating the textiles with a solution of reaction products of alcoholates of zirconium, titanium or aluminium of aliphatic, saturated, 1- or 2-valent alcohols with 2 to 6 carbon atoms, or with monoalkyl ethers of these 2-valent alcohols, whereby these monoalkyl ethers have totally 4 to 8 carbon atoms, and paraformaldehydes in a mol ratio of 1:1 to 1:10 in an organic solvent, removing the excess of the solution and then drying the textile at a temperature of 70° C. to 110° C.; the improvement comprising stabilizing the reaction product by adding thereto 0.06–1 mol metal soap of 2-, 3- or 4-valent metals with fatty acids with more than 5 carbon atoms per mol alcoholates.

2. The process in accordance with claim 1, comprising adding to the organic solution at least one hydrophobing agent or at least one agent improving the hand soluble in organic solvents.

3. The process in accordance with claim 1, wherein the fatty acid is one having from 8 to 18 carbon atoms.

4. The process in accordance with claim 1, comprising stabilizing the reaction products with 0.06–0.5 mol metal soap per mol alcoholate.

References Cited

UNITED STATES PATENTS

| | | | |
|---|---|---|---|
| 2,223,158 | 11/1940 | Licata et al. | 160—243 |
| 2,318,302 | 5/1943 | Fabian et al. | 117—135.5 X |
| 2,774,689 | 12/1956 | Orthner et al. | 117—135.5 |
| 3,002,949 | 10/1961 | Nitzsche et al. | 117—135.5 X |

WILLIAM D. MARTIN, Primary Examiner

T. G. DAVIS, Assistant Examiner

U.S. Cl. X.R.

117—138.8, 141, 143, 144